United States Patent Office 3,465,057
Patented Sept. 2, 1969

3,465,057
CURABLE ESTER COMPOSITIONS
Grant McLay Cameron, Brockenhurst, and Angus John Duke, Weedon, Aylesbury, England, assignors to Ciba Limited, Basel, Switzerland, a company of Switzerland
No Drawing. Filed Feb. 8, 1966, Ser. No. 525,822
Claims priority, application Great Britain, Feb. 22, 1965, 7,619/65
Int. Cl. C08g 43/02, 23/00
U.S. Cl. 260—830   14 Claims

ABSTRACT OF THE DISCLOSURE

Curable compositions comprising an ester or mixture of esters, containing on average more than two mercaptan groups per molecule, of one or more mercaptocarboxylic acids with one or more polyhydric alcohols having a molecular weight of at least 250 and containing on average more than two hydroxyl groups per molecule, and an oxidative curing agent for the said ester or mixture of esters and are useful as sealants, caulking agents, cable-jointing agents, and the like.

---

This invention relates to curable compositions, which cure to form cured elastomeric products.

It is known to produce polymeric substances in which each molecule of polymer contains a plurality of sulphhydryl (—SH) groups which may be cured by the use of so-called oxidative curing agents to produce products in which the polymer molecules are linked by disulphide groups (—S—S—), which may be used, for example, as sealants and caulking agents (see, e.g., High Polymers, vol. 10, Part III, Polyethylene Sulphides and Other Polythioethers, ed. Gaylord, Interscience, 1962). The curing reaction may be made more rapid by the use of substances, e.g. tertiary amines, known as accelerators, and may also, if desired, be slowed down (e.g. to give materials of longer pot-life) by the use of inhibitors or retardants. Known polymers containing sulphhydryl groups which may be cured in this manner suffer from the disadvantage that they are relatively expensive, and that, unless prepared as dispersions or latices, they are liable to contain included starting materials which are difficult to remove.

This invention provides new curable compositions which comprise a compound containing sulphhydryl groups and an oxidative curing agent, in which the aforesaid disadvantages are avoided or mitigated.

The new compositions comprise an ester or mixture of esters, containing on average more than two mercaptan groups per molecule, of one or more mercaptocarboxylic acids with one or more polyhydric alcohols having a molecular weight of at least 250 and containing on average more than two hydroxyl groups per molecule, and an oxidative curing agent for the said ester or mixture of esters.

The invention includes within its scope the process which comprises curing the aforesaid compositions, especially under neutral or basic pH conditions, and with or without the application of heat, and the cured elastomeric products obtained thereby.

Particularly suitable esters containing on average more than two mercaptan groups per molecule may be represented by the general Formula I:

wherein R denotes a hydrocarbyl group, which may contain oxygen atoms in the chain, remaining after removal of $n$ hydroxyl groups from a said polyhydric alcohol, the said polyhydric alcohol having a molecule weight of at least 250, R' denotes an alkylene group, and $n$ denotes an integer of at least 3.

The curable compositions of the invention may contain esters having two mercaptan groups per molecule of a mercaptocarboxylic acid with a dihydric alcohol having a molecular weight of at least 250, provided that the composition as a whole comprises a mixture of esters as aforesaid containing on average more than 2 mercapto groups per molecule.

The aforesaid compositions may thus suitably further contain a minor amount, calculated on the weight of the ester of Formula I, of an ester of the general Formula II:

wherein R" denotes a hydrocarbyl group, which may contain oxygen atoms in the chain, remaining after removal of both hydroxyl groups from a dihydric alcohol, the said dihydric alcohol having a molecular weight of at least 250, and R' has the meaning previously assigned.

The polyhydric alcohol component of the ester or esters is preferably that formed by addition of an alkylene oxide, especially ethylene oxide or propylene oxide, to a triol, e.g. glycerol, or a higher polyol. Particularly preferred are polypropylene triols having an average molecular weight within the range 300 to 25,000, and especially within the range 2000 to 5000.

As examples of the mercaptocarboxylic acid component, there may be mentioned thioglycollic acid (2-mercapto-acetic acid), 2-mercapto-propionic acid, 3-mercaptopropionic acid, 4-mercaptobutyric acid, mercapto-undecylic acid, mercapto-stearic acid, and o- and p-mercapto-benzoic acids. Preferably, thioglycollic acid or 3-mercaptopropionic acid is employed; i.e. in the above general formulae R' preferably denotes —CH$_2$— or —CH$_2$CH$_2$—.

Especially preferred esters of the general Formula I are tris(thioglycollates) or tris(3-mercaptopropionates) of polypropylene triols, the said polypropylene triols having an average molecular weight within the range 2000 to 5000.

It is preferred to use mercapto-esters in which all the hydroxyl groups in the polyhydric alcohol have reacted with the mercapto-carboxylic acid, but it is within the scope of the invention to employ esters or mixtures of esters of the type hereinbefore specified which contain free hydroxyl groups. It is also within the scope of the present invention to employ esters as hereinbefore defined which are prepared by incomplete esterification of the polyhydric alcohol component with a stoichiometric deficit of a mercaptopolycarboxylic acid, such as mercaptosuccinic acid, followed by esterification of the free hydroxyl groups with a mercaptomonocarboxylic acid.

Particularly suitable dihydric alcohols for use in making mercapto-esters of the general Formula II for inclusion in the compositions of the present invention are poly(alkylene oxides), especially such hydroxyl-terminated oligomers as polyethylene glycols, polypropylene glycols, mixed polyethylene polypropylene glycols, and poly(tetrahydrofurans).

The esters used in the present invention may be prepared in a conventional manner, e.g. by reaction of the polyhydric alcohol component with the mercaptocarboxylic acid in the presence of an acid catalyst, the water formed during the reaction being removed as an azeotrope with a water-immiscible solvent.

As oxidative curing agent for use in the compositions of the invention, lead dioxide or tellurium dioxide is preferably used; but zinc oxide, magnesium oxide, organic peroxides, such as benzoyl peroxide and ethyl methyl ketone peroxide, and organic hydroperoxides, such as cumene hydroperoxide and tertiary butyl hydroperoxide, may also be used, as well as hot-curing agents such as p-benzoquinonedioxime. The curing agents may be used either in solution or dispersed in a plasticiser for the cured composition such as dibutyl phthalate or a chlorinated polyphenyl.

The curable compositions of the present invention preferably also contain an accelerator for the curing reaction. For this purpose may be used, for example, m-dinitrobenzene, sulphur, diphenylguanidine or tetramethylthiuram disulphide. If desired, an inhibitor or retardant, suitably a long-chain fatty acid (such as stearic acid or oleic acid) or a metal salt thereof (i.e. a soap, such as aluminum distearate, cadmium stearate or aluminium octoate), may be included to prolong the pot-life of the curable composition.

To promote rapid autogenous cure of the composition at room temperature, it is preferred also to incorporate a basic accelerator, especially a tertiary amine (such as triethylene diamine, i.e. 1,4-diazabicyclo[2.2.2.]octane, N-benzyldimethylamine, and 2,4,6-tris(dimethylaminomethyl)phenol) or an alkali-modified clay. By use of differing amounts of basic accelerator, compositions may be prepared having a large range of individual pot-lives.

To enhance the adhesive properties of the cured products of the present invention it is advantageous to incorporate in the curable compositions a tackifier or adhesion promoter, such as a liquid or solid resole phenolic resin, an epoxy resin, or a polyvinyl acetate.

The compositions may also comprise fillers and thixotropic agents such as finely-divided silica (especially that available under the registered trademark "Aerosil"), carbon black, lithopone, titanium dioxide, barytes, calcium carbonate, calcium silicate, magnesium silicate, and aluminium silicate and finely divided metals such as aluminum powder.

Fillers and other solid additives are advantageously incorporated in the compositions by ball-milling.

The compositions of the present invention may be used as sealants, caulking agents, cable-jointing agents, and the like. They are suitably supplied in the form of two separate formulations, one containing the ester of the mercaptocarboxylic acid, and the other the oxidative curing agent. The first formulation may further contain fillers, accelerators and other additives which do not react with the ester of the mercapto-carboxylic acid, and the second may also contain plasticisers and retardants. Immediately prior to use, the two formulations are mixed thoroughly and allowed to cure, with the application of heat if desired.

The following examples illustrate the invention. Unless otherwise specified, "parts" denotes parts by weight. The tellurium dioxide paste employed was made up of 6 parts of the dioxide to 4 parts of "Arochlor 1242," a chlorinated polyphenyl manufactured by Monsanto Chemical Co. The cumene hydroperoxide solution used was a commercially-available 73% solution of the hydroperoxide in a mixed ketone-alcohol solvent.

The mercaptan-containing esters utilised were prepared as follows. The mercaptan contents were determined by iodometric titration in chloroform. Absence of hydroxyl-absorption bands in the infra-red spectra of the products indicated that all the hydroxyl groups of the polyhydric alcohols had been esterified.

"ESTER A"

A mixture of 800 g. (0.2 g.-mol.) of "Polyurax G–4000" (a triol of average molecular weight 4000 made from glycerol and propylene oxide, manufactured by Pfizer Ltd.). 55.2 g. (0.6 g.-mol.) of thioglycollic acid, 5 g. of toluene-p-sulphonic acid, and 250 ml. of toluene was heated to reflux with stirring in an atmosphere of nitrogen. Water (10.8 ml., 0.6 g.-mol.) formed during the reaction was removed as its azeotrope with toluene. The reaction mixture was cooled and washed with water, and the organic layer separated. On removal under vacuum of the solvent from the organic layer, there remained 793 g. (94% of the theoretical yield) of the desired tris(thioglycollate), having a refractive index $n_D^{25}$ of 1.4552, and a mercaptan content of 0.59 equiv./kg. (theory is 0.71).

"ESTER B"

A mixture of 207 g. (0.103 g.-mol.) of a diol having an average molecular weight of 2025 prepared from propylene glycol and propylene oxide, 19 g. (0.205 g.-mol.) of thioglycollic acid, and 100 ml. of xylene was heated in a similar manner. Solvent was removed under vacuum from the reaction mixture. There remained 214.5 g. (98.7% of the theoretical yield) of the desired bis(thioglycollate), having a refractive index $n_D^{25}$ of 1.4553 and a mercaptan content of 0.83 equiv./kg. (theory is 0.92).

"ESTER C"

A mixture of 400 g. (0.1 g.-mol.) of "Polyurax G–4000," 32 g. (0.3 g.-mol.) of 3-mercaptopropionic acid, toluene-p-sulphonic acid (3 g.) and toluene (250 ml.) was heated, and the desired product isolated as described for "Ester A." There was obtaine 405 g. (95% of the theoretical yield) of the desired tris(3-mercaptopropionate) having a refractive index $n_D^{25}$ of 1.4553 and a mercaptan content of 0.64 equiv./kg. (theory is 0.70).

"ESTER D"

A mixture of 1000 g. (0.33 g.-mol.) of "Polyurax G–3000" (a triol similar to that used in the preparation of "Ester A" but having an average molecular weight of 3000), 94 g. (1.03 g.-mol.) of thioglycollic acid, toluene-p-sulphonic acid (4 g.) and toluene (600 ml.), was heated in a similar manner for 15 hours, 18 ml. of water being recovered. The cooled reaction mixture was washed with a dilute aqueous solution of sodium bicarbonate, and worked up as before. There was obtained 1065 g. (99% of the theoretical yield) of the desired tris(thioglycollate), having a refractive index $n_D^{25}$ of 1.4552 and a mercaptan content of 0.89 equiv./kg. (theory is 0.93).

Example 1

The following composition was prepared.

| | Parts |
|---|---|
| Ester A | 100 |
| Tellurium dioxide paste | 5 |
| m-Dinitrobenzene | 5 |
| Lithopone | 35 |
| "Aerosil" | 7.5 |
| Sulphur | 0.15 |
| 2,4,6-tris(dimethylaminomethyl)phenol | 1.2 |

It had a pot-life of about 1.5 hours and cured within 24 hours at room temperature to a strong, non-tacky, grey rubber.

Example 2

A composition was prepared in the same manner as in Example 1, 65 parts of Ester A and 35 parts of Ester B being used in place of the 100 parts of Ester A, and using 2 parts, rather than 1.2 parts, of 2,4,6-tris(dimethylaminomethyl)phenol. The composition cured within 24 hours at room temperature to a very elastic, grey rubber

Example 3

The following composition was prepared:

| | Parts |
|---|---|
| Ester A | 80 |
| Ester B | 20 |
| Lithopone | 35 |
| "Aerosil" | 7.5 |
| Cumene hydroperoxide solution | 7.5 |
| 2,4,6-tris(dimethylaminomethyl)phenol | 1.5 |

It cured within 24 hours at room temperature to a strong, white rubber.

Example 4

The following composition was prepared:

| | Parts |
|---|---|
| Ester A | 100 |
| Lead dioxide | 12.5 |
| Sulphur | 0.2 |
| Carbon black | 15 |
| 2,4,6-tris(dimethylaminomethyl)phenol | 2 |

It cured within 24 hours at room temperature to a very hard rubber.

Example 5

The following composition was prepared:

| | Parts |
|---|---|
| Ester C | 100 |
| Lead dioxide | 15 |
| Sulphur | 0.15 |
| Lithopone | 35 |
| "Aerosil" | 5.5 |
| 2,4,6-tris(dimethylaminomethyl)phenol | 2.5 |

It had a pot-life of about 2.5 hours, and cured within 24 hours at room temperature to a hard, strong, brown rubber.

Example 6

The following composition was prepared:

| | Parts |
|---|---|
| Ester D | 100 |
| p-Benzoquinonedioxime | 3.5 |
| Diphenylguanidine | 1.5 |
| Lithopone | 35 |
| "Aerosil" | 7.5 |

It cured after heating at 80° for 48 hours to a very strong, light-coloured rubber.

Example 7

The following mixtures were prepared:

| Component A: | Parts |
|---|---|
| Ester A | 100 |
| China clay | 124 |
| Titanium dioxide (rutile) | 30 |
| Phenolic resin | 5 |

| Component B: | |
|---|---|
| Lead dioxide | 10 |
| Di-n-butyl phthalate | 10 |
| "Aerosil" | 0.3 |

The china clay employed was an alkali-treated china clay available under the designation "Varon A" from Pluss-Stauffer A.G. of Oftringen, Switzerland; the phenolic resin was that available from Bakelite Ltd. under the designation "0014."

Components A and B were then mixed at room temperature; the proportions in which they were used, and the properties of the cured elastomers, are given in the following table.

| Formulation | | Tensile strength [1] (kg./sq. cm.): elongation [1]—(a) after cure for 14 days/ 23° C., (b) after cure for 7 days/23° C. then immersion in water for 7 days/ 23° C., (c) after cure for 7 days/ 23° C. then 7 days/ 60° C. | Adhesive properties [2] after cure for 14 days/23° C.— (a) strength (kg./ sq. cm.), (b) elongation, (c) mode of failure |
|---|---|---|---|
| Component A (parts) | Component B (parts) | | |
| 259 | 25 | (a) 6.2:125% (b) 5.6:150% (c) 4.8:165% | (a) 5.5. (b) 100%. (c) Cohesive, close to interface. |
| 259 | 22 | (a) 5.8:170% (b) 4.2:150% (c) 3.9:180% | (a) 3.8. (b) 60%. (c) Cohesive, close to interface. |
| 259 | 19 | (a) 5.1:180% (b) 4.4:150% (c) 3.9:180% | (a) 4.2. (b) 100%. (c) Cohesive, close to interface. |
| 259 | 16 | (a) 3.4:200% (b) 3.9:150% (c) 4.2:175% | (a) 3.0. (b) 80%. (c) Cohesive, close to interface. |
| 259 | 10 | (a) 0.85:>280% (b) 4.8:215% (c) 8.0:105% | (a) 2.1. (b) 340%. (c) Cohesive. |

[1] These properties were determined by mounting a cast specimen, 12.7 cm.×1.3 cm.×1.3 cm., of the elastomer at 23° C. in a tensile testing machine so that the initial jaw separation was 7.5 cm., and then increasing the separation at a rate of 0.085 cm. per second until failure occurred.

[2] These properties were determined by mounting horizontally a cast specimen, 5.1 cm. ×3.1 cm. ×1.3 cm., at 23° C. centrally on vertical aluminium plates (5.1 cm.×5.1 cm.) which had been cleaned with methyl ethyl ketone, the longest axis of the specimen being parallel to the plates. The aluminium plates were then pulled apart in a direction normal to the plane of the metal/elastomer interfaces at a rate of 0.042 cm. per second until failure occurred. The mode of failure of the specimen was classified as "adhesive" if clean separation between the elastomer and one aluminium plate occurred, or "cohesive" if failure occurred within the specimen.

What is claimed is:

1. A curable composition of matter comprising (1) at least one ester of at least one monomercaptocarboxylic acid with at least one polyhydric alcohol having a molecular weight of at least 250 and containing on average more than two hydroxyl groups per molecule, said ester containing on average more than two mercaptan groups per molecule, and (2) an oxidative curing agent for the said ester.

2. A composition according to claim 1, wherein the said ester is of the general Formula I:

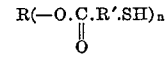

where R is a member selected from the group consisting of hydrocarbyl group and hydrocarbyl interrupted by oxygen atoms in the chain, said radical R being obtained by removal of $n$ hydroxyl groups from a polyhydric alcohol, R' is an alkylene group, and $n$ is an integer of at least 3.

3. A composition according to claim 2, which further contains a minor amount, calculated on the weight of the ester of general Formula I, of an ester of the general Formula II:

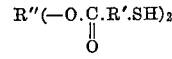

wherein R'' is a member selected from the group consisting of hydrocarbyl groups, and hydrocarbyl interrupted by oxygen atoms in the chain, remaining said radical R'' being obtained by removal of both hydroxyl groups from a dihydric alcohol, the said dihydric alcohol having a molecular weight of at least 250, and R' has the same meaning as in claim 2.

4. A composition according to claim 2, in which R' is $(CH_2)_x$ and $x$ is an integer of at least 1 and at the most 2.

5. A composition according to claim 1, wherein the polyhydric alcohol from which the ester (1) is derived, is one formed by addition of an alkylene oxide to polyol containing at least 3 hydroxyl groups.

6. A composition according to claim 5, wherein the polyhydric alcohol from which the ester (1) is derived is one formed by addition of a member selected from the group consisting of ethylene oxide and propylene oxide to a triol.

7. A composition according to claim 6, wherein the polyhydric alcohol from which the ester (1) is derived, is a polypropylene triol having an average molecular weight within the range 300 to 25,000.

8. A composition according to claim 7, wherein the polypropylene triol from which the ester (1) is derived, has an average molecular weight within the range 2000 to 5000.

9. A composition according to claim 5, wherein the ester (1) is derived from a polyhydric alcohol formed by addition of an alkylene oxide to glycerol.

10. A composition according to claim 1, wherein the oxidative curing agent is a member selected from the group consisting of lead dioxide and tellurium dioxide.

11. A composition according to claim 1 which further contains a basic accelerator for the oxidative curing reaction.

12. A composition according to claim 11, wherein the basic accelerator is a member selected from the group consisting of tertiary amines and alkali-modified clays.

13. A composition according to claim 1 which further contains a tackifier.

14. A composition according to claim 13, wherein the tackifier is a member selected from the group consisting of resole phenolic resins, epoxy resins and polyvinyl acetates.

References Cited

UNITED STATES PATENTS 3,369,040    2/1968    De Acetis _____ 260—468

MURRAY TILLMAN, Primary Examiner

C. J. SECCURO, Assistant Examiner

U.S. Cl. X.R.

161—213; 260—838, 874, 79, 37, 38, 481, 901